Patented July 4, 1933

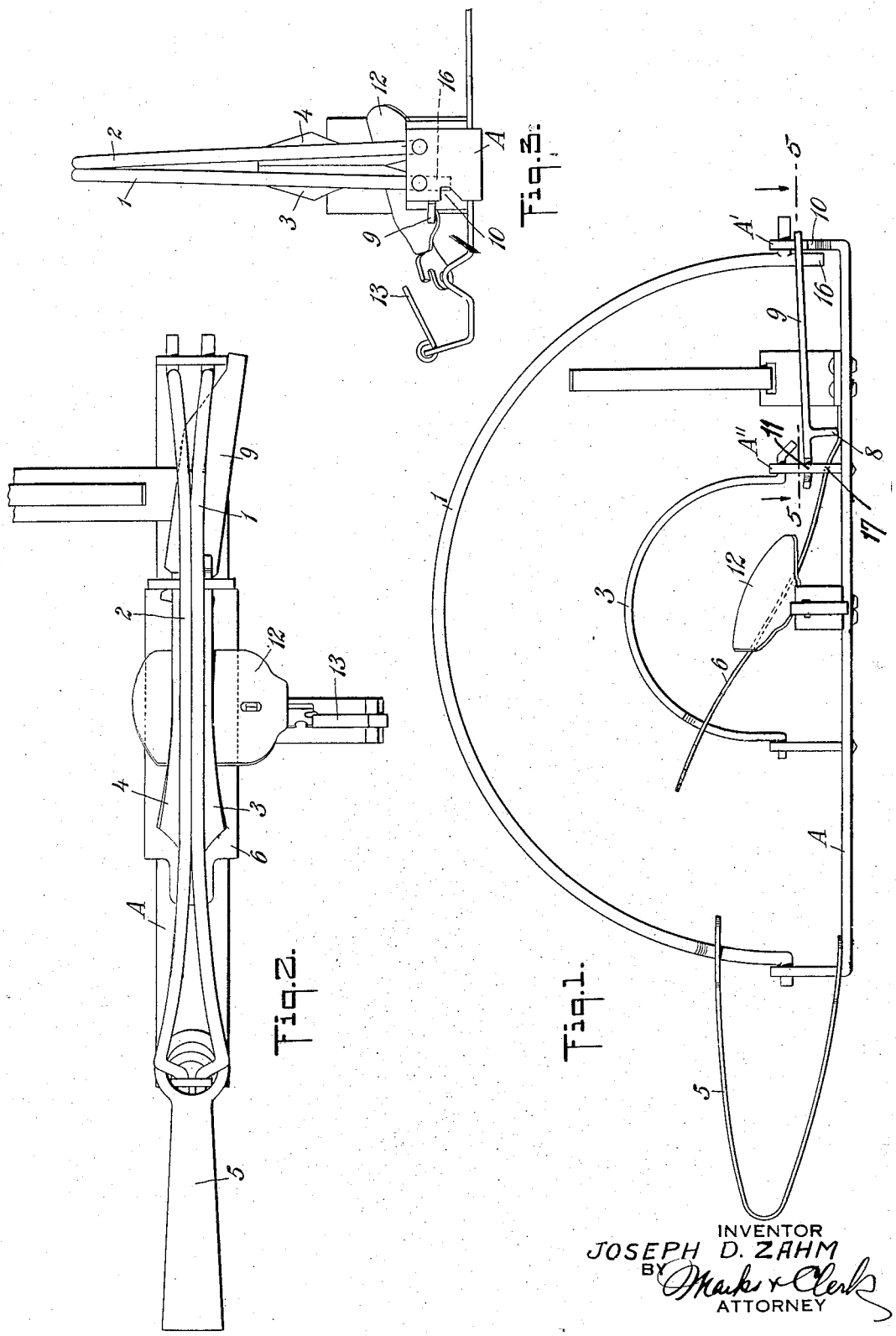

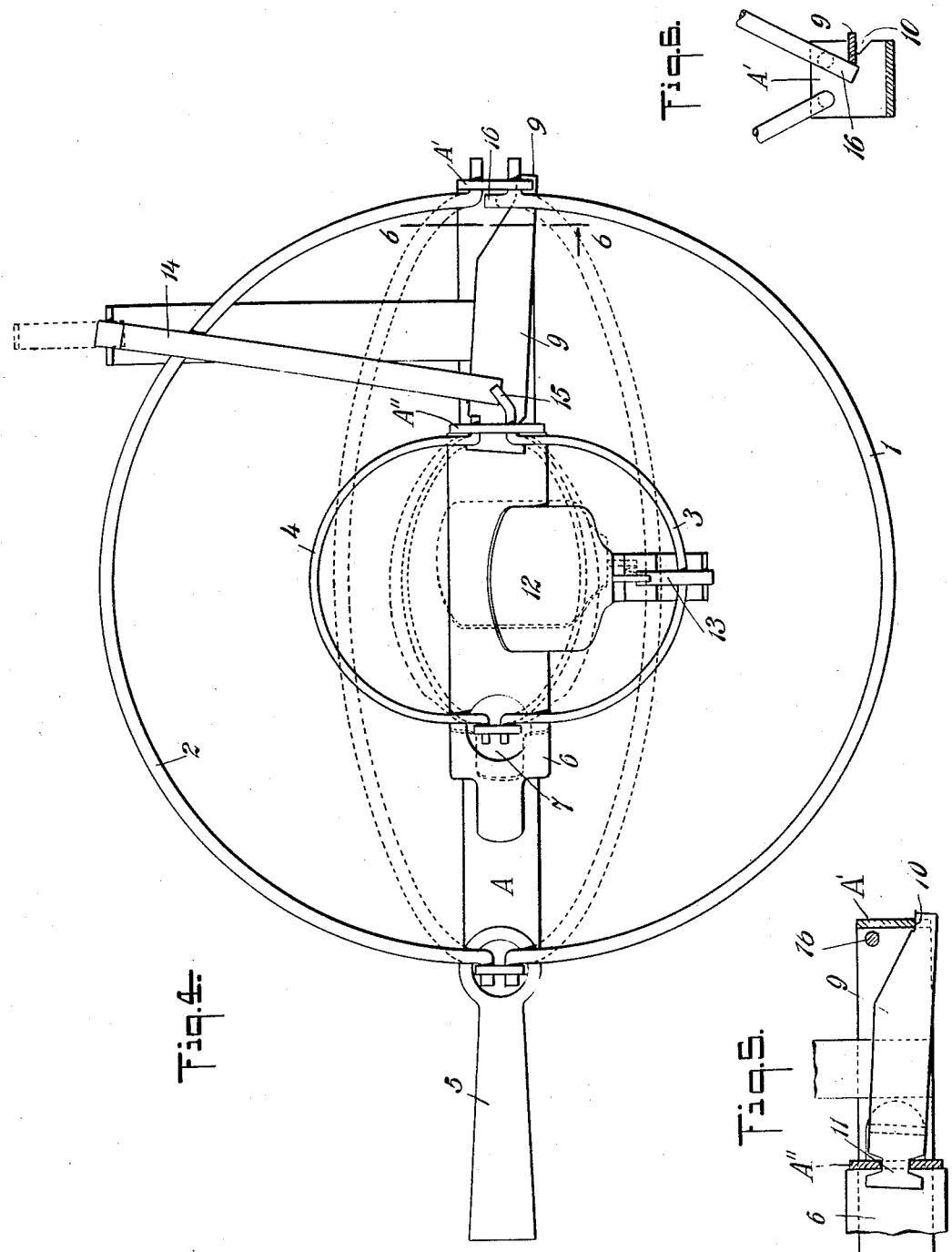

1,916,876

UNITED STATES PATENT OFFICE

JOSEPH D. ZAHM, OF LITITZ, PENNSYLVANIA, ASSIGNOR TO ANIMAL TRAP COMPANY OF AMERICA, OF LITITZ, PENNSYLVANIA, A CORPORATION OF PENNSYLVANIA

SELECTIVE DOUBLE JAW TRAP

Application filed May 22, 1929. Serial No. 364,959.

This invention relates to traps adapted to catch animals and the like and particularly to such as have a selective action in the manner of the size of the animals which are unfortunate enough to come into contact with them.

It is the main object of the invention to provide a trap which will catch animals only greater than a certain size.

A more specific object of the invention comprises the provision of a trap having a plurality of sets of jaws whose actions are interdependent.

Further features and objects of the invention will be apparent from the following description taken in conjunction with the accompanying drawings, the invention being more particularly indicated in the appended claims.

In the drawings:—

Fig. 1 is a side elevation of one form of trap in the completely closed position, Fig. 2 is a plan view of the trap shown in Fig. 1, Fig. 3 is an end elevation of the same arrangement, Fig. 4 is a plan view of the trap when set, showing a further position in dotted lines, Fig. 5 is a sectional view along the line 5—5 in Fig. 1, and Fig. 6 is a sectional view along the line 6—6 in Fig. 4.

Referring to the drawings it will be seen that there is shown a trap comprising a main frame member A and mounted thereon in a well-known manner two sets of jaw members, 1, 2 and 3, 4 one of which is larger or of greater diameter than the other. One of the sets 1, 2 is provided with a bow spring 5 of the usual character, and the other jaws 3, 4 are provided with a spring 6 passing through an aperture 17 (Figure 1) in upstanding part A″ on the main frame and having at one end an aperture as at 7, the sides of which are adapted to bear on the jaw members in the usual manner. Contacting with the other end of spring 6 which is not attached to base A but passes through guiding aperture 17 is a T-shaped tension lever 9, having one end passing through a second aperture 11 in the upstanding part A″, and the other end adapted to be inserted in notch 10 in the upturned end A′ of the main frame. When tension lever 9 is inserted in notch 10, tang 8 attached to lever 9 presses downwardly on the end of spring 6, holding it solidly against frame member A, thus providing full tension for spring 6.

The smaller jaw members are associated with the usual platform 12 and retaining catch 13 and may be associated with any similar springing member such that upon contact with the same the jaws will be "tripped" and the trap brought into action.

The larger jaw members are held in the open position by means of a lever 14 whose free end contacts with a projection 15 on one of the ends of one of the smaller jaw members 3. One end of one of the larger jaw members 1 is provided with an extension 16 positioned near to the notch 10 in which the end of tension lever 9 is adapted to fit.

In operation the trap is set by opening jaw members 1 and 2 sufficiently to allow extension 16 to clear notch 10, placing tension lever 9 into notch 10 and thus making spring 6 effective. The smaller jaw members 3 and 4 are then opened and held so by the action of dog 13 and platform 12. Larger jaws 1 and 2 are set and held open by means of lever 14 under extension 15. The spring 6 is thus made "active" and jaw members 3, 4 are provided with their requisite spring power.

When fully set as shown in the full line position in Fig. 4 and an animal contacts with the platform 12 and releases the catch 13 of the small jaw members, 3, 4 and consequently these jaw members are "sprung" and close upon the animal and in doing so the projection 15 of the jaw member 3 in its rotation releases the end of the lever 14 associated with the larger jaw members 1 and 2. As a consequence of this the larger jaw members are allowed to close together under the action of the spring 5 and in doing so the extension 16 tends to push outwards from the notch the tension lever 9 of the spring 6 associated with the smaller jaw members. The extension 16 as shown in Fig.

6 is just about to begin moving tension lever 9 from the notch.

The arrangement is such that this release of the tension lever 9 will take place only if the angle between the planes containing the larger jaw members is less than a predetermined value. This in turn depends on the minimum size of the animal it is required to catch.

For instance, supposing a small animal steps upon the platform 12, the smaller jaws will be released and the animal held thereby, the position of the smaller jaws being for example as shown in dotted lines in Fig. 4. As a consequence of the release of the small jaw members the lever 14 of the larger jaw members is released and these are allowed to spring together. If the animal is of such a small size that the large jaw members can close completely together as shown in Figs. 1–3 then the extension 16 will throw tension lever 9 out of notch 10, thereby allowing tang 8 to release its clamping pressure on spring 6 which will then be rendered ineffective. The smaller jaw members will thus have no constraint or spring action upon them.

On the other hand if a large animal contacts with the trap the smaller jaw members 3, 4 will be released and will hold the animal; the release of the small jaws will effect the release of the large jaws as before but if the animal is of such a size that the large jaws cannot close beyond a certain point as shown in dotted lines in Fig. 4 then the extension 16 will not be able to rotate sufficiently to press the tension lever 9 out of the notch 10 and will not move appreciably from the position shown in Fig. 6. As a consequence of this the smaller jaw members 3, 4 will remain under compression of their own spring 6 and the animal will be retained by them and also by the larger jaw members 1, 2 which are under constraint from their own spring 5 and which owing to the size of the animal are not allowed to release the smaller jaws by coming completely together. It will be seen, therefore, that the animal of large size will be held in effect by two traps whilst the animal of small size will be held for a moment by the smaller jaws but when, as it were, the selecting action of the larger jaw has been effective the smaller jaws will be rendered ineffective by the complete release and loosening of spring 6 and the animal will be finally released.

The actual embodiment above described and illustrated in the drawings is to be taken merely as an example of carrying the invention into effect and it is obvious that I may vary the form, shape and size of the various jaw members, their number and also the means for effecting the control of one set by means of the action of another set. Any convenient method of co-relating the action of the various jaw members may be utilized in order to carry out this invention. Such and similar modifications are to be deemed within the scope of the invention as set out in the appended claims.

I claim:

1. An animal trap comprising a set of small jaws, a set of large jaws, a spring for said small jaws and a releasable tension lever for said spring releasable by said large jaws.

2. An animal trap comprising a set of small jaws, a set of large jaws actuating means for said large jaws and animal releasable means for holding them in a set position, a spring for said small jaws having a tension lever, and an extension on one of said large jaws for releasing said tension lever.

3. An animal trap comprising a main frame, a set of small jaws and a set of large jaws on said frame, an extension on one of said small jaws, a retaining catch for said large jaws held by said extension, and a spring for said small jaws said spring being rendered inoperative by and upon complete closure of said large jaws.

4. An animal trap comprising a main frame, a set of small jaws and a set of large jaws mounted on said frame, an extension on a large jaw and an extension on a small jaw, a retaining catch for said large jaws contacting with the small jaw extension, a spring for said small jaws and a tension lever for said spring, contactable with and releasable by said large jaw extension.

5. An animal trap comprising a main frame having a notch, a set of large jaws and a set of small jaws on said frame, a spring for said small jaws having a tension lever positioned to fit into said notch, and an extension on one of said large jaws for releasing the tension lever which when in said notch is in the path of movement of said extension.

6. An animal trap comprising a set of small jaws, a set of large jaws, actuating means for the large jaws and animal releasable means for holding them in a set position, and a spring for said small jaws loosely guided and coacting with said large jaws, said spring being rendered ineffective by and upon the final and complete closure of said large jaws.

7. An animal trap comprising a main frame having a notch, large and small jaw members on said frame and spring means for said jaws, a tension lever for the small jaw spring fitting into said notch on said frame to render the spring operative, and an extension on one of said large jaw members for moving said tension lever from said notch upon closure of said large jaws beyond a predetermined point.

8. An animal trap comprising a frame having a notch, a pair of small jaw members having a spring and a platform release mechanism, and an extension on one of said jaw members, a tension lever operatively connected with said spring positioned to fit into said notch, a second pair of jaw members, a retaining catch for said second pair, one end of which is pivoted to lie under said extension and a projection on one of the members of said second pair positioned to move said tension lever from said notch.

In testimony whereof I affix my signature.

JOSEPH D. ZAHM.